April 11, 1944.   W. C. ROSENTHAL   2,346,332
SPEED REGULATING MECHANISM
Filed July 14, 1942   2 Sheets-Sheet 2
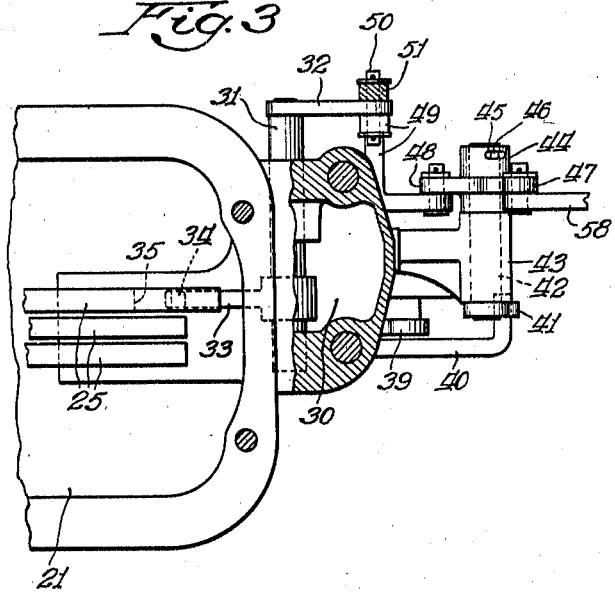
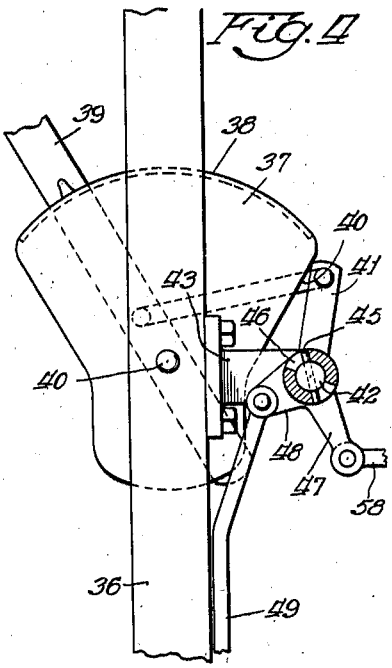
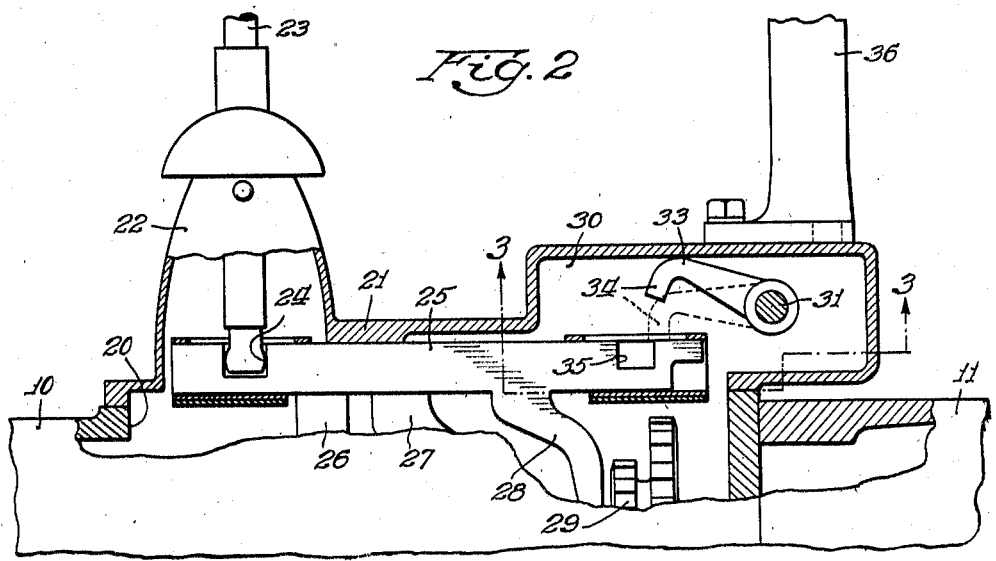
Inventor:
William C. Rosenthal
By Paul O. Pippel
Atty.

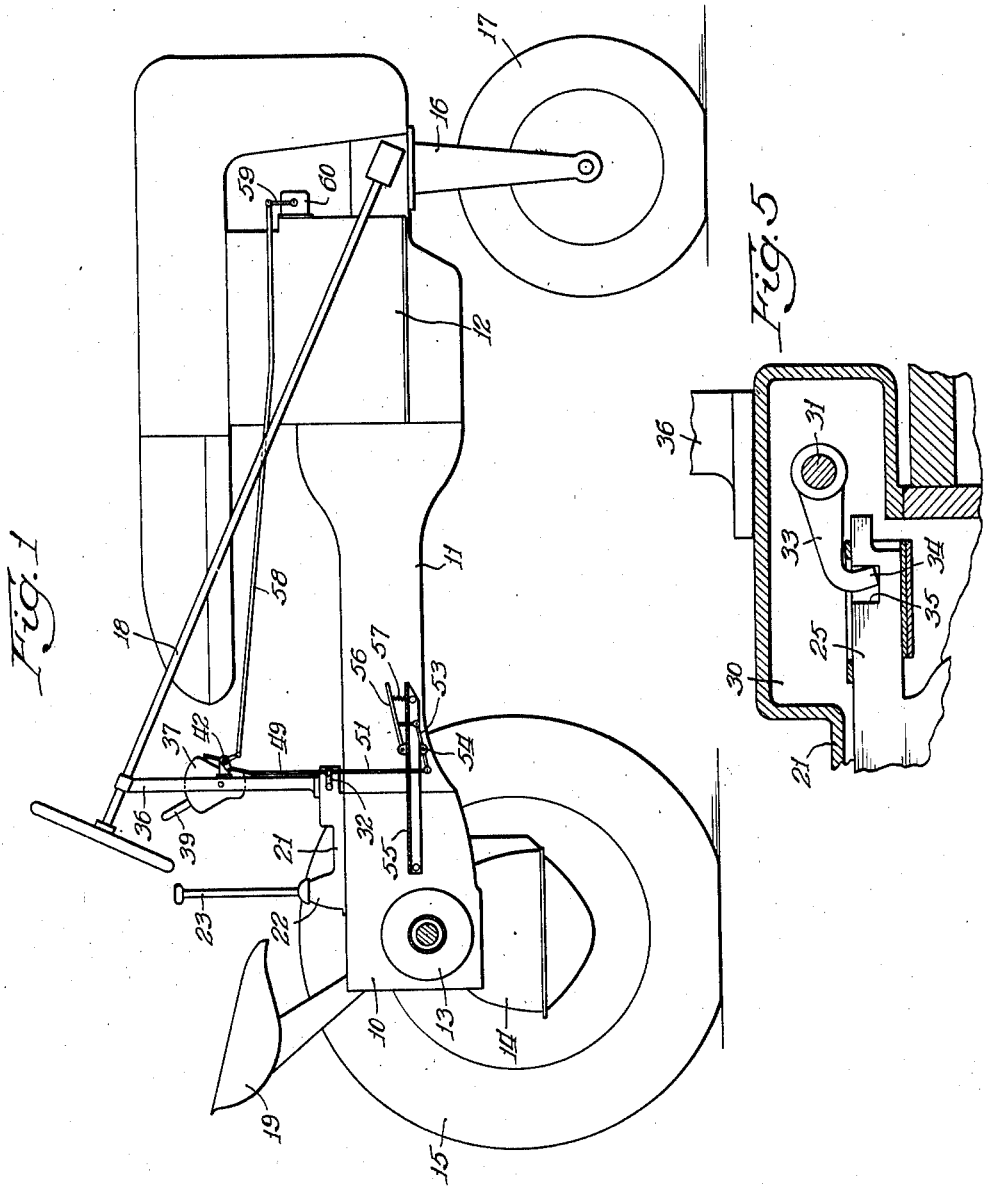

Patented Apr. 11, 1944

2,346,332

UNITED STATES PATENT OFFICE 2,346,332

SPEED REGULATING MECHANISM

William C. Rosenthal, Chicago, Ill., assignor to International Harvester Company, a corporation of New Jersey Application July 14, 1942, Serial No. 450,881

2 Claims. (Cl. 74—472)

This invention relates to a speed regulating and controlling mechanism for automotive vehicles. More particularly, it relates to a device for permitting higher engine speeds in certain gear ratios than in others. The principal object of the invention is to provide a stop means controllable by a gear shift lever for selective speed transmissions to regulate the engine speed and resulting power output in accordance with the gear ratio selected.

A more detailed object is to provide a combination with an engine having a governor mechanism, manual means for setting the governor for different constant speeds of operation, and, additionally, providing foot-operated accelerator means for variable speed operation.

Another object is to combine with the accelerator mechanism stop means operated by the gear shift lever to permit higher engine speed operation for road speed when the torque applied to the drive mechanism is not large.

The objects set forth above, and others which will be apparent from the detailed description to follow, are accomplished by a structure one form of which is shown in the drawings, in which Figure 1 shows diagrammatically an agricultural tractor with the linkages necessary to carry out the functioning of the invention illustrated;

Figure 2 is an enlarged view of the transmission cover plate broken away in section to show a portion of the change speed transmission and the cooperation therewith of the lock-out or stop means forming the invention;

Figure 3 is a section taken on the line 3—3 of Figure 2;

Figure 4 is an enlarged view of the force transfer mechanism located on the steering column of the tractor;

Figure 5 shows a portion of Figure 2 with the stop means in the high-speed position.

The tractor illustrated is conventional in construction having a rear transmission casing in a final drive housing 10, a central frame section 11, and a forward engine unit 12. The housing 10 is connected, by rear axle structures 13, to depending final drive housings 14 which carry the traction wheels 15. A front bolster construction 16 carries a steerable front wheel 17. A steering shaft 18 extends from the front of the tractor to adjacent the rear for operation from the seat 19.

The transmission casing 10 has a large top opening 20 over which a transmission cover 21 is mounted. Said transmission normally includes an upright hollow portion 22 on which a gear shift lever 23 is mounted for individual movement. The lower end of said lever is provided with means for engaging any one of a plurality of notches 24 provided in shifter rails 25, one of which is shown in Figure 2, all three of which are visible in Figure 3. Said rails carry shifter forks 26, 27, and 28, as shown by the broken-away portion of the transmission casing 10 in Figure 2. The shifter fork 28 is attached to the shifter rail 25 and is adapted to move the gear cluster 29 in the right-hand direction, as viewed in Figure 2, to select the high-speed gear ratio of the tractor. In modern tractors this high-speed gear ratio is designated as road speed and may be as much as fifteen or twenty miles an hour as compared with the field working speeds of the tractor which vary from one to five miles per hour. The cover 21 is modified in the construction illustrated from common practice to include a chamber 30. Said chamber provides a housing for the stop means which will now be described.

A shaft 31 extends transversely through the chamber 30, being mounted for rotation in the side walls of that portion of the cover plate and extending through one side wall, as shown in Figure 3, being connected to a lever arm 32. Within the chamber 30 the shaft 31 is provided with a lever arm 33 having a downturned portion 34 which may rest either against the top of the shifter rail 25 or may move downwardly into a notch 35 formed in the forward end of said rail.

A supporting column 36 for the steering shaft 18 is mounted at the forward end of the cover plate 21. Said column is also utilized for supporting a plate-like member 37 which is formed with a quadrant 38 for engagement with a speed-selecting lever 39. Said lever is pivoted on a shaft 40 and is adapted to be manually moved over the sector 38 to select different engine speeds. The lever 39 is connected by a link 40 with a lever 41 secured on the end of a shaft 42 which is rotatably supported in a bracket 43 secured to the column 36. A sleeve 44 is rotatably mounted on the shaft 42, its rotation being limited by a pin 45 extending through the shaft and centrifugally located slots 46 formed in the sleeve 44 in the vicinity of the pin 45. The sleeve 44 carries a downwardly extending lever arm 47 and a rearwardly extending lever arm 48, the two arms and the sleeve making up what might be termed a bell crank. The arm 48 is connected by a push rod 49 with the lever arm 32. This connection is formed with a pin 50 extending through the arm. A second link 51 is also connected to said pin, said second link extending downwardly, as shown in Figure 1, and being connected to a lever 53 pivotally mounted on a bracket 54 extending below an operator's platform 55. A foot accelerator pedal 56 pivoted on the platform is connected to the lever 53 for oscillating said lever, a spring 57 being provided to urge the pedal in an upward direction.

The downwardly extending arm 47 is connected by a tension rod 58 with a governor control lever 59 extending from a housing 60 in which a conventional centrifugal governor is mounted. In the operation of the device as above described, the operator may adjust the lever 39 to regulate the position of the governing control lever 59 and to thereby select different constant speeds of operation as regulated by the governor. In the rear position of the lever 39, as illustrated, the governor is set for idle or slow speed operation. With the lever 39 in this position, the lever arm 33 is in the lifted position shown in solid lines in Figure 2. If the operator desires to increase the speed of the engine as controlled by the governor, the lever 39 would be shifted forwardly along the sector 38, being held in any of the adjustable positions by frictional engagement. Such motion would rotate the shaft 42 and by means of the pin 45 would rotate the sleeve 44, thereby moving the lever arm 47 and applying additional tension to the governor arm 59 thus increasing the speed of the engine. If the operator wishes to use the foot accelerator pedal 56 for a varying rate of engine speed operation, the rod 51 would be pushed upwardly and through the lever 52; the shaft 31 would be rotated bringing the lever arm 33 downwardly toward the dotted-line position of Figure 2. The movement of the lever 39 would have the same effect in moving the lever arm 33 toward the dotted-line position. In the use of either the manual lever 39 or the foot pedal 56, the lever arm 33 would move downwardly until it engaged the top of the shifter rail 25, as shown in Figure 2. This would be a limiting position and would act as a stop means to limit the top speed of the engine.

Figure 5 shows the position of the shifter rail 25 when the gear ratio is selected, giving the top speed or road speed of the tractor. The notch 35 is moved forwardly under the downturned portion 34 of the lever arm 33. The stop means provided by the rail is therefore removed and it is possible, by either operating the manual lever 39 or the foot pedal 56 to swing the lever arm 47 farther to the rear thereby applying additional force to the governor in the direction to increase the speed of the engine.

The construction as above described is particularly adapted for tractors having a high road speed, which may be as high as fifteen or twenty miles per hour. The engines ordinarily provided for tractors of this type are capable of speeds considerably higher than those ordinarily used for heavy traction loads in the low gear ratios which give tractor speeds of from one to five miles an hour with a very large effective traction. Due to the large gear reduction in the transmission when using these speeds, even at a governed engine speed of 1400 to 1600 R. P. M., the final drive mechanism beyond the gear reduction must be made very strong to stand the great torque developed after the gear reduction. When such tractors are operated on the highway for pulling loaded vehicles or for transport, the traction load is relatively light. It is then permissible to operate the engine at a speed considerably above that used for heavy duty work. Moreover, as the gear reduction is much smaller at the higher speeds the higher engine R. P. M. does not impose undue torque strains on the final drive mechanism.

It is to be understood that applicant has shown and described only a preferred embodiment of his improved control mechanism for automotive vehicles, and he claims as his invention all modifications falling within the scope of the appended claims.

What is claimed is:

1. Vehicle accelerator means comprising combined hand- and foot-operated levers, a common link shiftable by each of said levers, means interposed between said levers to limit control movement thereof, said means comprising a detent operated by said link and caused to move upon movement of said link by either of said levers, and slidable rail means for limiting movement of said detent, said rail having a notch therein whereby in at least one position of said rail the detent is permitted greater arcuate swing.

2. Vehicle accelerator means comprising hand- and foot-operated levers, a link reciprocable by operation of each of said levers, a transmission having gear-shift means, means intermediate said levers to limit control movement of said link, said means comprising a detent operated by said link and caused to swing upon movement of said link by either of said levers, and a rail slidable upon actuation of said gear-shifting means for limiting swing of said detent, said rail having a notch therein whereby in one position of said rail the detent is permitted greater arcuate swing.

WILLIAM C. ROSENTHAL.